United States Patent
Leggett et al.

(10) Patent No.: US 7,972,099 B2
(45) Date of Patent: Jul. 5, 2011

(54) SELF-TENSIONING TIE DOWN SYSTEM

(76) Inventors: Timothy S. Leggett, Kamloops (CA); Casey K. Dundass, Kamloops (CA); Andrew R. Ross, Kamloops (CA)

(*) Notice: Subject to any disclaimer, the term of this patent is extended or adjusted under 35 U.S.C. 154(b) by 1164 days.

(21) Appl. No.: 11/596,773

(22) PCT Filed: May 17, 2004

(86) PCT No.: PCT/CA2004/000745
§ 371 (c)(1),
(2), (4) Date: Nov. 17, 2006

(87) PCT Pub. No.: WO2005/110810
PCT Pub. Date: Nov. 24, 2005

(65) Prior Publication Data
US 2007/0269285 A1  Nov. 22, 2007

(51) Int. Cl.
*B60P 7/08* (2006.01)
(52) U.S. Cl. .................................. 410/103; 410/100
(58) Field of Classification Search .............. 410/12, 410/97, 100, 103; 24/265 CD; 254/217, 254/223, 290, 315, 293, 294, 228, 361, 376, 254/277, 321, 320, 340, 93 VA; 248/499
See application file for complete search history.

(56) References Cited

U.S. PATENT DOCUMENTS

| 4,036,476 | A | | 7/1977 | Douce et al. |
|---|---|---|---|---|
| 4,045,002 | A | | 8/1977 | Miller |
| 5,853,164 | A | | 12/1998 | Hunt |
| 5,860,777 | A | * | 1/1999 | Walsh et al. ............ 410/100 |
| 2003/0031524 | A1 | | 2/2003 | Brunet |

FOREIGN PATENT DOCUMENTS

| CA | 1065837 | | 11/1979 |
|---|---|---|---|
| CA | 2385491 | | 7/2003 |
| EP | 1371521 | A2 | 12/2003 |
| SE | 305415 | | 10/1968 |

* cited by examiner

*Primary Examiner* — Stephen Gordon

(57) ABSTRACT

A self-tensioning tie down assembly and safety system for tightening the retaining straps securing cargo on a carrier. Retaining straps are connected to winches connected to the carrier. A ratchet system is used to tighten the winch. A two bar torque linkage has a ratchet arm connectable to the ratchet wheel of the winch via a socket and has a connector arm connected to an actuator. The actuator is connected to a pneumatic/electrical circuit and provides reciprocating linear motion thereby actuating the torque linkage. The torque linkage may be set in a tightening or loosening position. The required tension level of the retaining strap is pre-set. Pressure within the circuit drives the actuator thereby actuating the torque linkage which tightens the strap on the winch until the tension level is reached. Signals are sent to a display panel to indicate when a strap is loose.

12 Claims, 7 Drawing Sheets

SELF-TENSIONING TIE DOWN SYSTEM

FIELD OF THE INVENTION

The present invention relates to a self-tensioning tie down assembly and safety system, and more particularly to an assembly for automatically tensioning tie down straps about a winch and relaying the status of the tie down straps to an operator.

BACKGROUND OF THE INVENTION

As the earth's population continues to grow and the global market for products expands, safe transportation for goods becomes increasingly important. Goods are often transported by a carrier having some form of platform upon which the goods are placed, such as, but not limited to, a flat bed trailer. Any movement of the goods could result in damage to the goods and/or create a safety hazard, for example if items began falling off the trailer thereby causing a motor vehicle accident. A further safety hazard can arise as a result of cargo shifting sufficiently to create an unbalanced load thereby adversely affecting the vehicle performance. This can prove especially dangerous when the flat bed trailer is cornering as the cargo shift may have increased the propensity for the trailer to rollover. The goods must therefore be secured in order to prevent any moving or shifting. Various tie down assemblies have been developed for this purpose.

The tie down straps are typically fastened and tensioned with the aid of winch having a manual ratchet mechanism. Such ratchet mechanisms are known in the art, for example, as shown in U.S. Pat. Nos. 4,045,002 and 5,853,164, and may be used for several fastening applications. The inherent limitation with these systems is the lack of monitoring and appropriate automatic adjustment of the strap tension during transit. This problem is a very common concern for flatbed trailers carrying cargo for the transportation industry. Operators are left wondering if they have adequately secured their cargo before departure and especially during transit, when the contents may shift slightly, adversely impacting on the tension of the strap and on the load distribution. Another weakness with the manual ratchet mechanism is the risk of injury to the operator. To manually secure tie downs, operators have to exert large forces, which often lead to physical injury.

An automatic take-up winch is taught in U.S. Pat. No. 4,036,476 to Douce. The Douce device employs an actuating unit that advances the winch by applying force on the teeth of the ratchet wheel, one tooth at a time. While the automatic take-up winch of the '476 patent overcomes the deficiency of the strictly manual winches, it suffers from a number of its own deficiencies. For example, because the Douce winch relies on the direct application of force against a tooth of the ratchet wheel, the force required is very high. The device therefore requires a strong source of pressure, which can be problematic given the small amount of available space below the carrier. In addition, the Douce invention is susceptible to failure as a result of debris build-up on the ratchet wheel teeth since the actuating unit needs to directly engage each tooth. The constant force being applied to the teeth also leads to increased wear of the teeth such that over time they will require replacement. Furthermore, the entire actuating unit and winch is one pre-formed unit such that the actuating unit may not be used in association with the winches that are already mounted on a carrier.

There are also no systems in place to monitor the tension of the retaining straps holding the cargo of a carrier in place and provide feedback to the operator of the carrier. The current tie down winches used on cargo carriers employ a passive mechanical system that does not monitor the condition or effectiveness of the system.

Accordingly, it is an object of an embodiment of the present invention to provide an automated tie down mechanism having a monitoring and active response system.

It is a further object of an embodiment of the present invention to provide an automated tie down mechanism that can be used with the existing winches on a carrier.

It is a further object of an embodiment of the present invention to overcome the deficiencies noted above.

Other objects of the invention will be apparent from the description that follows.

SUMMARY OF THE INVENTION

The invention consists of an apparatus that provides autonomous monitoring as well as an active response to loosening tie down straps. The system is designed such that it is easily integrated to the existing tie down winch/ratchet mechanism that is used extensively in the flatbed transportation industry. The existing tie down winch can still be utilized in its original format when the present invention is disengaged. This provides users with the option to independently adjust and control the method of use for each individual winch.

The invention mimics the torque driven motion that is developed with a traditional human powered torque bar. The invention reduces the required length of the torque bar by increasing the input driving force. The invention consists of coupling a two bar torque linkage with the existing ratchet wheel on a winch assembly. A pneumatically driven actuator powers the two bar torque linkage. One of the members in the two bar linkage is a reversible drive ratchet. The actuator produces linear reciprocating motion which is transmitted and converted by the drive ratchet into the required torque action; a tightening torque in one direction and freewheel in the other. The generated torque is developed on the existing ratchet wheel by means of a socket attached to the two bar linkage. The ratchet wheel is connected to a spool about which the tie down strap is wrapped. The forced rotation of the ratchet wheel and spool results in the tightening of the tie down strap. In this fashion, the ratchet wheel and spool are tightened one tooth at a time until the strap is tight. If the system is not powered, the user can manually employ the existing ratchet mechanism in its non-automated format if so desired.

The invention advances the existing ratchet mechanism one ratchet wheel tooth increment at a time. A pawl prevents the ratchet from uncoiling when the two bar linkage and actuator are retracting and re-setting for the next advance motion. When the ratchet mechanism advances, an electrical signal is sent to a display panel that informs the operator that the tie down strap is loose. The signal is conveyed to the operator with a flashing LED light for a pre-set time period until the loosening condition subsides.

According to the preferred embodiment of the invention there is provided a self-tensioning tie down assembly for use in automatically tightening a retaining element on a winch securing cargo on a carrier. The assembly comprises a mounting bracket, an acuator, a linkage, and a power source. The mounting bracket connects to the carrier adjacent to the winch and the actuator is mounted on the bracket. The actuator has an extended and retracted positions and, when powered by the power source, provides reciprocating linear motion between the two positions. The linkage has a portion connected to the actuator and another portion connectable to the winch. The actuator and linkage are adapted so that when the actuator is actuating, it transmits a tightening torque through the linkage to the winch.

In another aspect, the actuator comprises a piston in a cylinder. The piston has a piston rod that is connected to a portion of the linkage. A pair of magnetic sensors are positionable on the cylinder and are adapted to sense the position of the piston within the cylinder and to send a corresponding signal to the power source.

In another aspect, the linkage comprises a connector arm connected to the actuator and a torque arm connected to the winch. The torque arm has an arm portion and a drive ratchet portion. The arm portion is connected to the connector arm and the drive ratchet portion is connectable to a socket, which in turn is connectable to the winch. The drive ratchet portion is fitted within the arm portion and is rotatable therein. The direction of rotation of the ratchet portion is selectable.

In another aspect, the power source comprises a source of pressurised air and a control panel for controlling the release of this air. The pressurised air is contained within a reservoir that is fillable from the carrier.

In yet another aspect, the control panel comprises a pressure regulator and valve to adjust and activate the pressurised air. The pressure regulator is adjustable and once set controls the tension of the retaining element.

In another aspect the assembly is adapted to operate automatically to tighten the winch until the retaining element reaches a desired tension.

According to a further embodiment of the invention there is provided a self-tensioning tie down assembly for use with a winch for tensioning a tie down securing cargo to a carrier. The assembly comprises a mounting bracket, an actuator, a power source, a control panel, and a linkage. The mounting bracket is adapted to be mounted to the carrier. The actuator is mounted to the mounting bracket and provides a reciprocating action when actuated. The power source provides power to the assembly, with the power being distributed by the power distribution system. The linkage converts the action of the actuator into a torque that is applied to the winch.

According to a further embodiment of the invention there is provided a monitoring system for use with a self-tensioning tie down assembly for use in automatically tightening a retaining element on a winch securing cargo on a carrier. The monitoring system comprises a display panel and a sensor. The display panel is positionable adjacent to the driver of the carrier and the sensor is adapted to sense when the tie down assembly is acting to tighten the retaining elements and to activate an indicator on the display.

In another aspect, the monitoring system further comprises a second indicator on the display, wherein the indicator is activated when the tie down assembly is receiving power.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DESCRIPTION OF THE PREFERRED EMBODIMENTS

Figure 1:
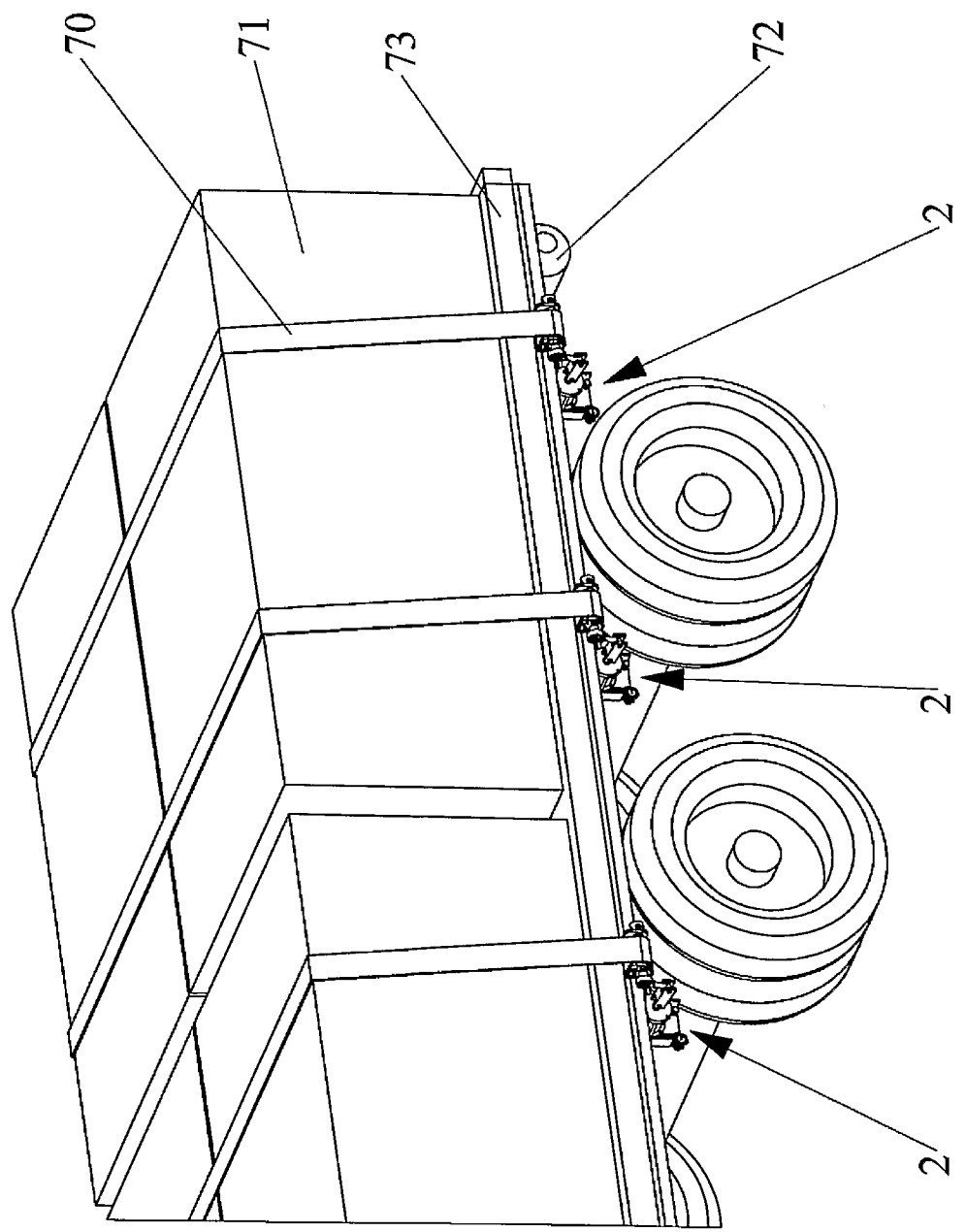
FIG. 1 is a perspective view of a portion of a flat bed trailer equipped with a preferred embodiment of a self-tensioning tie down assembly according to the invention.

A flatbed trailer 73 carrying cargo 71 restrained by tie down straps 70 and equipped with a self-tensioning tie down assembly 2 and safety system according to the invention is shown in FIG. 1. The preferred embodiment of the self-tensioning tie down assembly 2 is shown in FIGS. 2 through 5. Components of the assembly are described below, with identical reference numbers used for identical parts.

Figure 2:
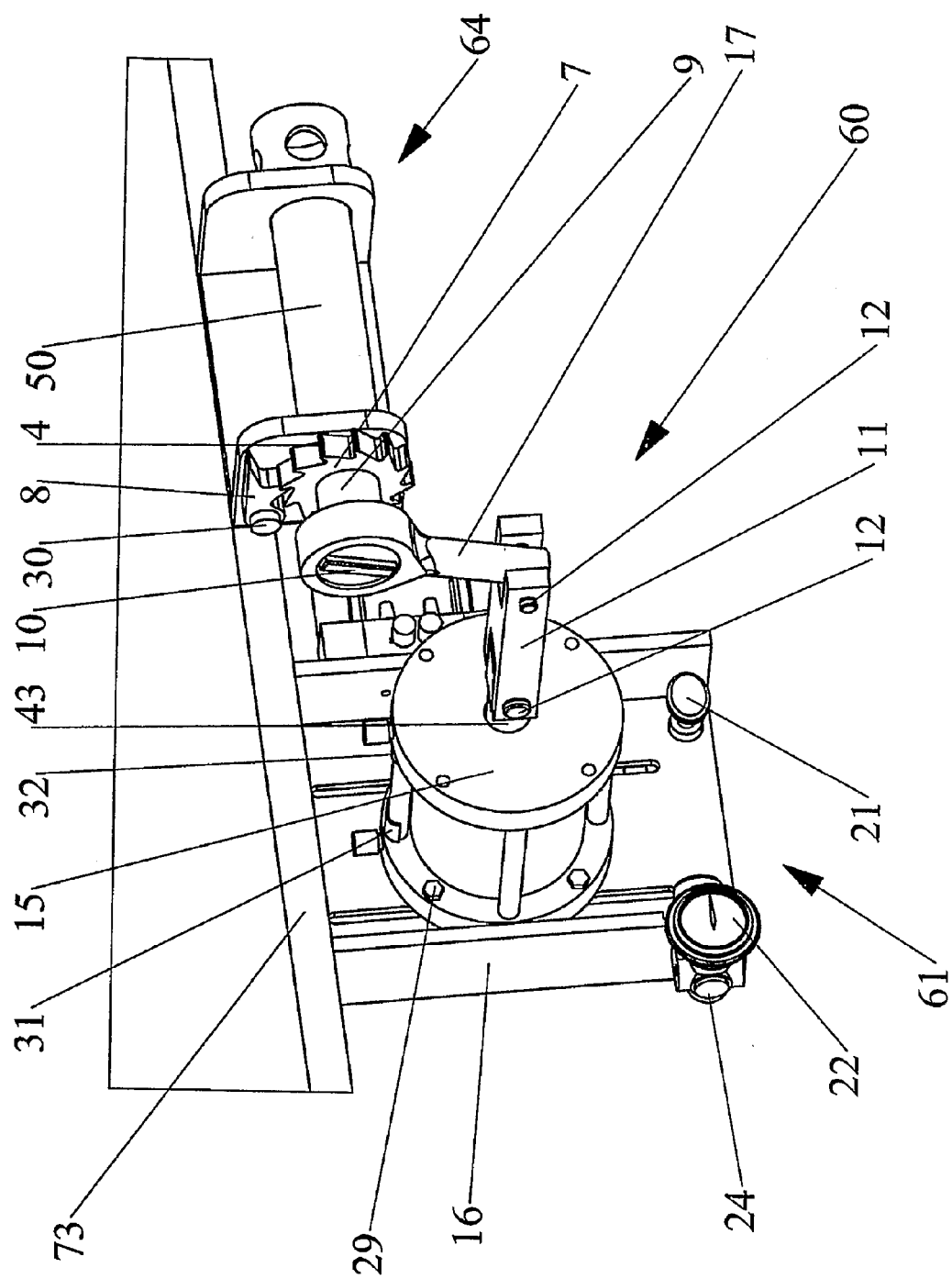
FIG. 2 is a front perspective view of the preferred embodiment of a self-tensioning tie down assembly according to the invention.
Figure 3:
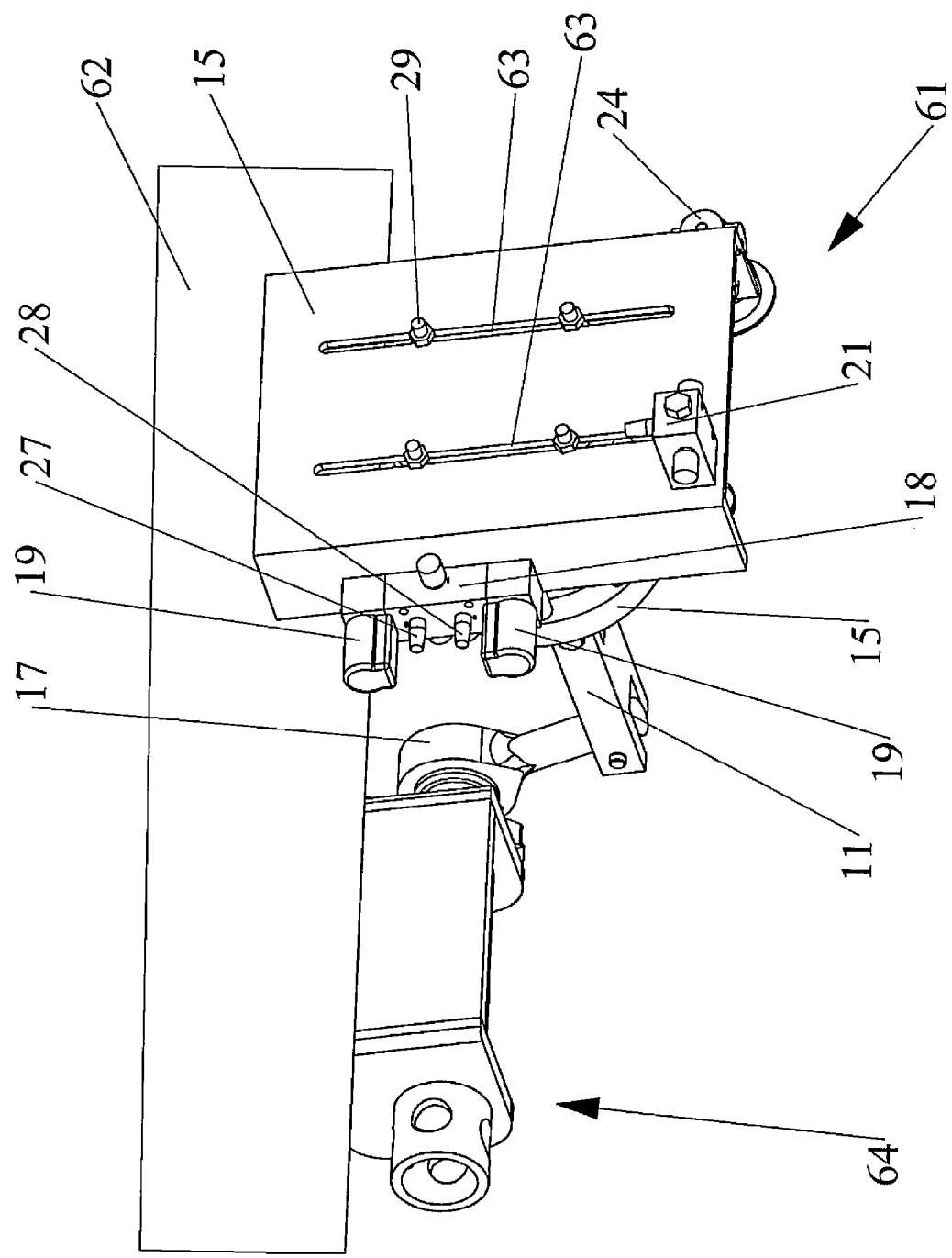
FIG. 3 is a rear perspective view of the assembly shown in FIG. 2.
Figure 4:
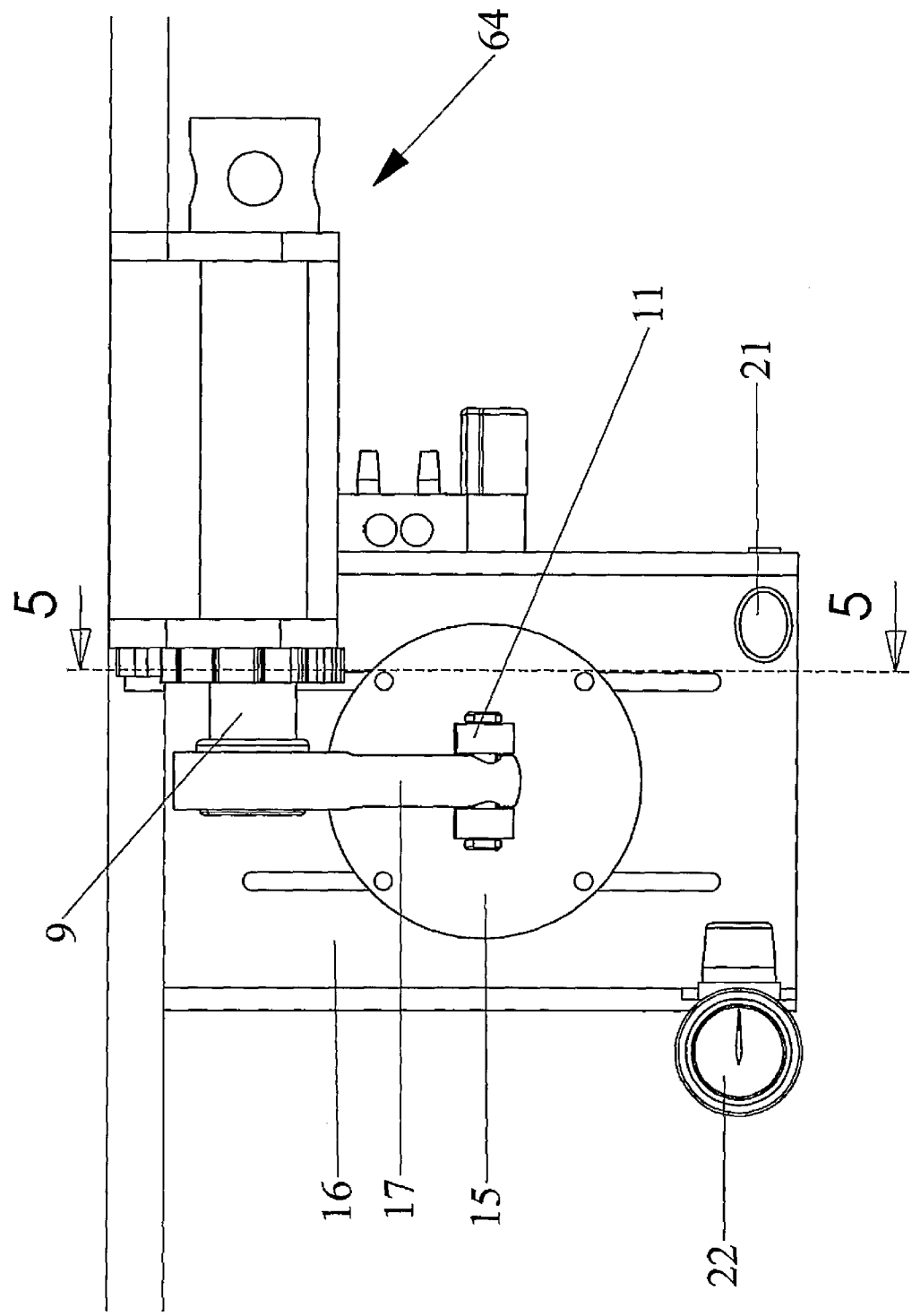
FIG. 4 is a front plan view of the assembly shown in FIG. 2.
Figure 7:
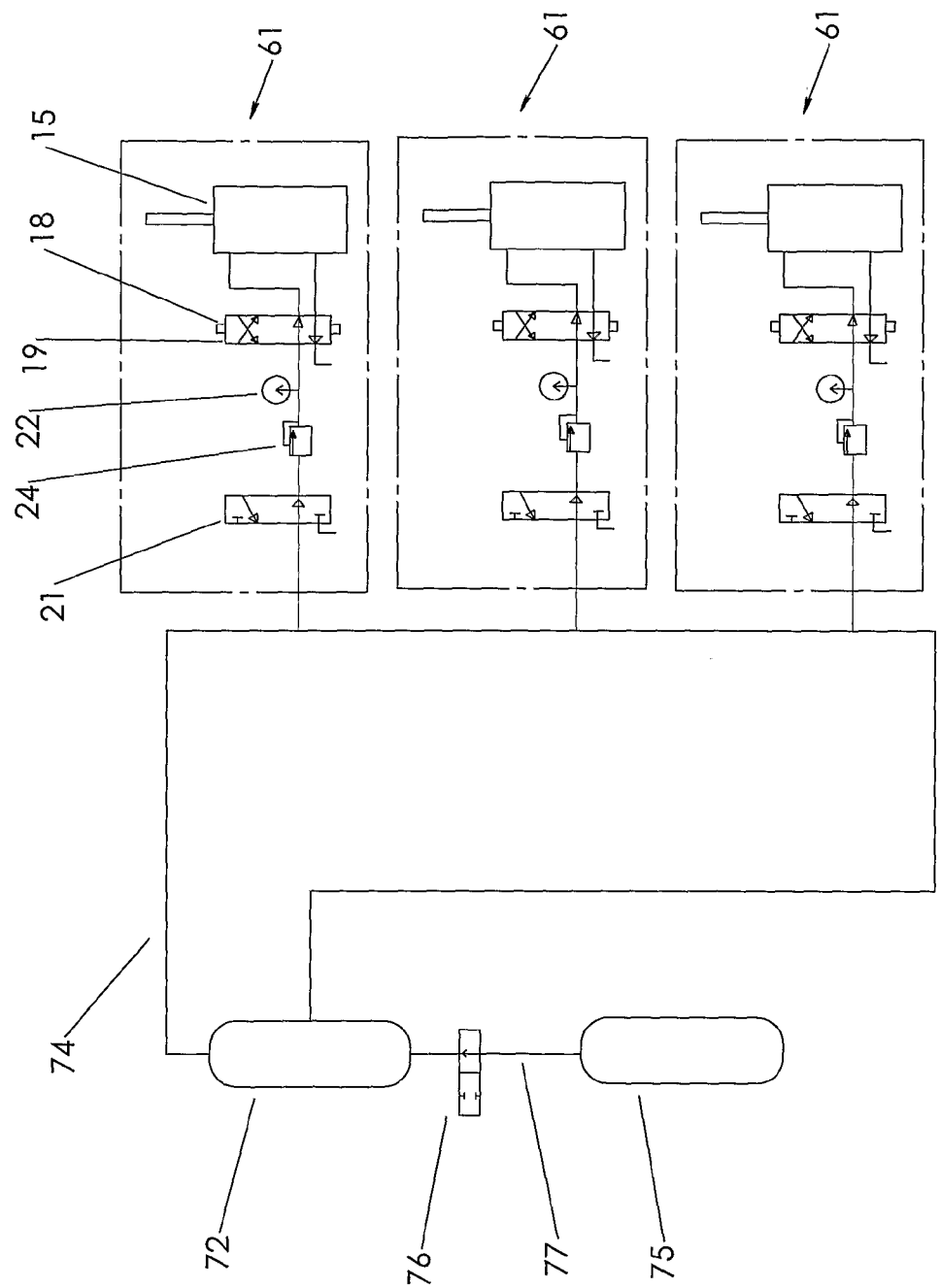
FIG. 7 is a pneumatic circuit diagram of the system according to the invention showing the connection between a plurality of self-tensioning tie down assemblies and a truck air line.

Referring now to FIGS. 2, 3 and 7, the tie down assembly 2 has a mounting bracket 16, an actuator 15, a two bar torque linkage 60, a pair of magnetic sensors 31, 32, a source of pressurised air 72 and a pneumatic/electrical circuit 61. The circuit 61 comprises a 2-way control valve 21, a pressure regulator 24, a pair of solenoids 19 on a 4-way control valve 18, and an actuator 15 as shown in FIG. 3. The tie down assembly is designed to be used in association with a winch 64 mounted on a carrier. The retaining elements 70 used to retain the cargo 71 as shown in FIG. 1 are tightened about the winch. Preferably the retaining elements are tie down straps, but could also take the form of cables, ropes, chains, or the like. The assembly 2 provides automatic tightening of the winch in order to tension the strap and can be used in conjunction with pre-existing winches already mounted on a carrier or can be formed with a winch and the combined assembly and winch then mounted in place on a carrier. The functioning of the components of the assembly 2 will be described in greater detail below.

The mounting bracket 16 is preferably in the form of a generally "C"-shaped channel, which is permanently welded to the underside frame 62 of the flatbed trailer 73 as shown in FIGS. 2 and 3. The mounting bracket 16 serves as a rigid mount for the actuator 15 and the circuit 61. The mounting bracket 16 has two slots 63 that allow for multiple mounting locations of the actuator 15 to accommodate a variety of differing underside frame rails as found on different flat bed trailers.

Figure 5:
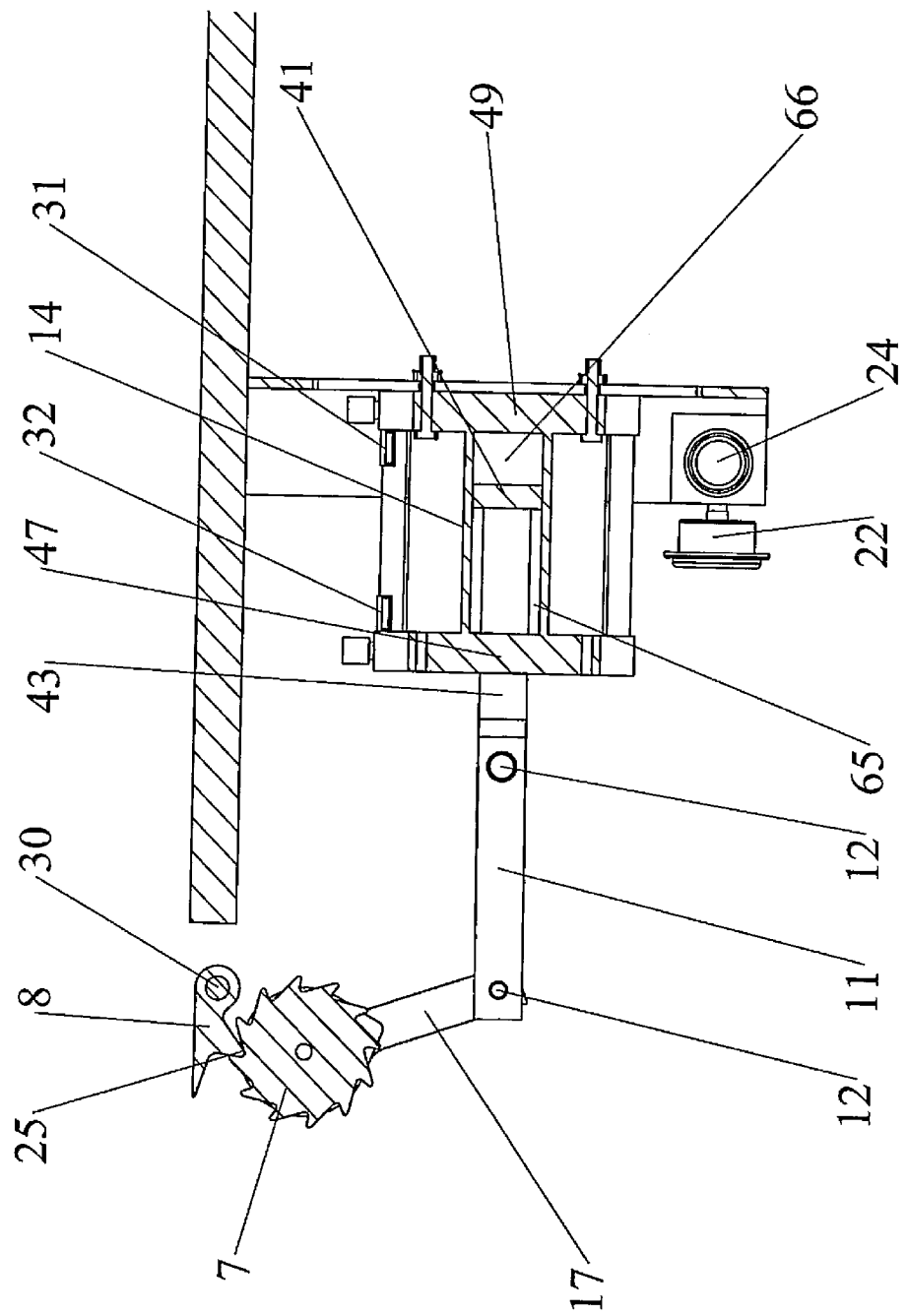
FIG. 5 is a sectional view taken along the line 5-5 shown in FIG. 4.

The actuator 15 is attached to the mounting bracket 16 with four bolts 29 for ease of removal should the actuator 15 require maintenance. As shown in FIG. 5, the actuator 15 is preferably a piston 41 in a cylinder 14, the piston having a piston rod 43, the actuator producing a double acting motion. The body of cylinder 14 is capped at either end by head walls 47 and 49. Piston rod 43 passes through a sealed opening in head wall 47. The piston 41 divides the interior chamber of the cylinder into two chambers: a retract chamber 65 and an extend chamber 66, the chambers being located on either side of the piston 41. The piston 41 and piston rod 43 are preferably driven by pressurised air in a linear reciprocating fashion as will be described in more detail below. It is also contemplated that the actuator could take the form of any assembly provided it produces a double acting motion, for example an electrical or mechanical linear drive having a lead screw or gear.

Preferably, the pressurised air for use in the system is contained in a reservoir 72 that is connected to a pressure distribution system in the form of conduit 74 as shown in FIG. 7. The 2-way control valve 21 of each self-tensioning tie down assembly 2 is connected to the pressure distribution system 74. This 2-way control, valve 21 allows the user to activate the assemblies 2 individually as required by the cargo characteristics. The reservoir 72 draws a supply pressure from the existing on-board pneumatic brake circuit of the flatbed vehicle. A main directional control valve 76 separates the reservoir 72 from the air brake supply line 77 and air brake reservoir 75. When the control valve 76 is opened, the reservoir 72 is filled with the same supply pressure as the brake lines 77. Once the reservoir 72 is full, this control valve is shut off so that no brake pressure is consumed by the various tie down assemblies 2 in use. The user can activate the control valve 76, however, should the reservoir 72 require filling at a later stage. Preferably a local gauge is connected to the reservoir in order to provide information on the status of the pressure level to the operator in the cab.

Two magnetic sensors 31, 32 mounted on the external side of, and at opposite ends of, the cylinder 14 determine and control the range of the linear motion of the actuator. Actual positioning of the magnetic sensors can be varied depending on the length of reciprocating action required. When the piston 41 is positioned in substantial radial alignment with, and adjacent to, one of the two magnetic sensors 31, 32, the respective magnetic sensor is activated. When a magnetic sensor is activated, it sends an electrical signal to control valve 18. Based on the electrical signal received, the control valve 18 directs the pressurised flow of air from the air source 72 into the retract chamber 65 or extend chamber 66 of the actuator 15. More specifically, the electrical signal activates the appropriate solenoid 19 on the control valve 18, which in turn causes the appropriate port 27, 28 to open.

When the retract magnetic sensor 32 is activated, a signal is sent to the control valve 18, activating the appropriate solenoid and causing the retract port 28 to open the flow of pressurized air to the retract chamber 65 of the actuator 15 while opening and exhausting the extend chamber 66 to the outside atmosphere. The pressure builds inside the retract chamber 65 of cylinder 14 forcing the piston 41 towards the head wall 49 and piston rod 43 to begin retracting into the cylinder 14. The piston 41 and piston rod 43 continue to retract until the extend magnetic sensor 31 is triggered by the proximity of the piston 41. The magnetic sensor 31 sends a corresponding electrical signal to the control valve 18, thereby activating the corresponding solenoid. The solenoid causes the extend port 27 on the control valve 18 to open and exhaust the retract chamber 65 to the outside atmosphere while incoming high pressure is directed towards the extend chamber 66. The high pressure air entering the extend chamber 66 forces the piston 41 towards the head wall 47. In this fashion the actuator 15 continues to cycle in a reciprocating linear motion between the two magnetic sensors 31, 32 until an equilibrium state is reached. Conduits (not shown) such as rubber hoses or the like are used to connect the various components of the circuit. The aforementioned system is shown as a pneumatic circuit schematic in FIG. 7. It should be noted that any number of tie down assemblies 2 and their corresponding pneumatic/electrical circuits 61 may be employed such that the system is not limited to the diagram shown herein.

The reciprocating linear motion of the actuator 15 is transmitted as an equivalent reciprocating rotational motion to the winch 64 through the two bar torque linkage 60. The two bar torque linkage has a connector arm 11 and a reversible drive ratchet torque arm 17. The end of the piston rod 43 is connected to the connector arm 11, which in turn is connected to the drive ratchet torque arm 17. The connector arm 11 is connected to the end of the piston rod 43 by way of a pin joint 12 or the like. At one end the torque arm 17 is connected to the connector arm 11 by way of a pin joint 12. At the other end the torque arm 17 is attached to a socket 9, which in turn is connected to a ratchet wheel 7 having teeth 4 as shown in FIG. 2. Preferably, the socket 9 is permanently welded to the center of the ratchet wheel 7. The torque arm 17 is preferably a cut off standard drive/torque ratchet that snaps into the socket 9.

The drive ratchet arm 17 can transfer torque in one direction while freewheeling in the other. The drive ratchet arm 17 is a reversible mechanism that is capable of reversing the drive/freewheel direction through the reversing lever 10. The reversing lever has two positions: a tightening and a loosening configuration. When the reversing lever 10 is oriented in a tightening configuration as shown in FIG. 2, the drive ratchet arm 17 transfers a tightening torque to the socket 9 and ratchet wheel 7 when the actuator 15 is retracting. With the reversing lever in the tightening orientation, the drive ratchet arm 17 freewheels when the actuator is extending. The opposite occurs when the reversing lever is in the loosening orientation. The reversibility of the system ensures that it may be connected with winches having either clockwise or counter clockwise tightening rotation and allows for the loosening of the winches as discussed further below.

When the system is activated, the actuator 15 retracts and rotates the torque arm 17 in a tightening direction. The torque arm in turn rotates the socket 9, which forces the ratchet wheel 7 to rotate with the torque arm 17. The arm 17 continues to rotate until the extend magnetic sensor 31 is triggered. Concurrently a pawl 8 connected by pin 30 to the existing winch 64, is engaged in the dedendum section 25 of a tooth 4 on the ratchet wheel 7 as shown in FIG. 5. In this configuration the pawl 8 resists the unloading motion of winch 64. Since the ratchet wheel 7 is held in this position by pawl 8, the torque arm 17 is free to rotate (freewheel) in a loosening direction without unloading the stored torque in the winch 64. The actuator 15 extends to its fullest position as set by the positioning of the retract magnetic sensor 32 and resets itself for the cycle to continue when the retract sensor 32 is once again triggered.

The cycle continues until such time as an equilibrium state is reached. In this state the driving force from the actuator 15 and corresponding torque developed on the winch 64 are equalized by the force and corresponding torque developed by the resistance in the tie down strap 70, which is wrapped about spool 50. This state of equilibrium results in no further motion in the system until such time as the input torque is larger than the resistance torque. During transit, slack is often developed in the strap 70 that would cause the resistance torque to drop and the system to once again re-tighten the strap 70 to equalize the torques. In this fashion the system is continuously applying a tightening torque on the winch 64.

Should the operator wish to loosen the tie down strap, the system need simply be depressurised and reversing lever 10 switched from tightening to loosening. The tension in the strap will cause the ratchet assembly 64 to loosen until pawl 8 restricts the unwinding motion. The user can manually disengage pawl 8 and completely undo the strap 70.

The amount of applied torque can be adjusted to accommodate different cargo. This adjustment is made by manual modification to a regulator 24 that controls the amount of pressure input to the main actuator 15. A gauge 22 is connected to each regulator 24 so that the operator can determine the desired pressure. Each tie down assembly 2 connected to the system has its own regulator 24 such that the applied torque can be individually set for each tie down assembly 2. This allows for the safe transport of various cargo and loading configurations on the same flatbed.

The present invention acts to ensure that each strap will be tightened to the pre-set tension whenever slack develops, this tension being regulated by the pressure. The device is able to accommodate for changes in climate during transit; for example, an increase in temperature causing the strap to expand such that slack develops. The system of the invention will sense this and tighten the strap to the pre-set tension.

Figure 6:
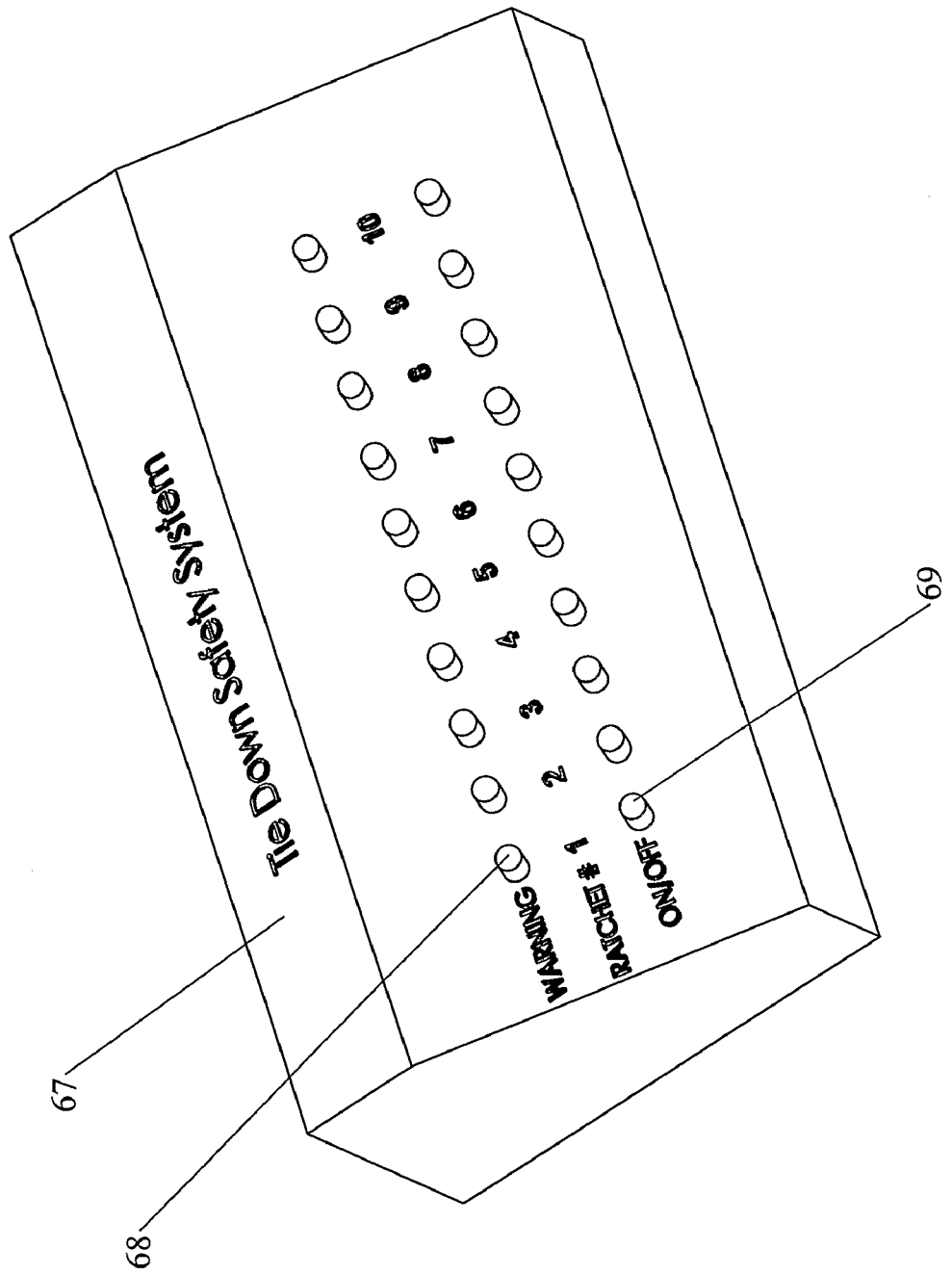
FIG. 6 is a perspective view of a display panel for use with a self-tensioning assembly according to the invention.

Preferably, the system is adapted to monitor the activity of each individual tie down assembly 2 and its corresponding winch 64 and communicates that information to the user. A display panel 67 consisting of LED's reflects the activity of each tie down assembly 2 connected to the system, as shown in FIG. 6. Preferably, the display panel is connected to the tie down assembly, more specifically, the retract magnetic sensor is connected to the LEDs. When the retract magnetic sensor is activated (indicating the ratchet wheel is indexing to the next tooth) a signal is sent to and converted to a flashing light. A green LED light 69 is illuminated for each individual tie down assembly 2 that is powered on by the system. A red flashing LED 68 is illuminated for each individual tie down assembly 2 that is in motion indicating a loose strap.

The display panel is programmed to automatically shut off the red LED 68 after a set period of time. Preferably, the set period of time will be slightly longer than the time required by the tie down assembly to complete one cycle of the piston from the retract sensor to the extend sensor and back to the retract sensor. As long as the retract magnetic sensor continues to be activated as the piston cycles, the red LED 68 will continue to flash. In this way, the red LED 68 will continue to flash until the loose condition subsides and the tie down assembly stops indexing the ratchet wheel 7 of the winch 64. The display panel 67 is preferably housed in the cab of the truck that is towing the trailer. The signals can be sent between the truck and trailer by means of a hard-wired connection or short distance wireless technology.

It is also contemplated that other display systems could be used. For example, the display could have one green light and one red light for the entire system, thereby reducing the cost. While this does not provide the added detail of the display system discussed above, it is expected that once a problem has been identified to the driver, the driver will stop to check the cargo.

It will be appreciated by those skilled in the art that the preferred and alternative embodiments have been described in some detail but that certain modifications may be practiced without departing from the principles of the invention.

What is claimed is:

1. A self-tensioning tie down assembly for use in automatically tightening a retaining element on a winch securing cargo on a carrier comprising:
   a mounting bracket connected to said carrier adjacent to said winch;
   an actuator having an extended position and a retracted position, said actuator being mounted to said bracket and when powered providing reciprocating linear motion between said extended and retracted positions;
   a linkage, a portion of said linkage being connected to said actuator and another portion of said linkage being connectable to said winch;
   a power source for actuating said actuator;
   wherein when said linkage is connected to said winch and when said actuator is actuating, said actuator transmits a tightening torque through said linkage to said winch; and
   a display unit connected to a circuit, said circuit being mounted to said bracket, wherein said circuit sends a signal to said display unit to indicate when said actuator is being actuated.

2. A self-tensioning tie down assembly for use in automatically tightening a retaining element on a winch securing cargo on a carrier comprising:
   a mounting bracket connected to said carrier adjacent to said winch;
   an actuator having an extended position and a retracted position, said actuator comprising a piston in a cylinder, said piston having a rod, said actuator being mounted to said bracket and when powered providing reciprocating linear motion between said extended and retracted positions;
   a linkage, a portion of said linkage being connected to the rod of said piston of said actuator and another portion of said linkage being connectable to said winch;
   a power source for actuating said actuator;
   wherein when said linkage is connected to said winch and when said actuator is actuating, said actuator transmits a tightening torque through said linkage to said winch,
   said actuator further comprising a pair of magnetic sensors positioned on said cylinder, said sensors adapted to sense the position of the piston within said cylinder and to send a corresponding signal to said power source.

3. A self-tensioning tie down assembly for use in automatically tightening a retaining element on a winch securing cargo on a carrier comprising:
   a mounting bracket connected to said carrier adjacent to said winch;
   an actuator having an extended and a retracted position, said actuator comprising a piston in a cylinder, said piston having a rod, said actuator being mounted to said bracket and when powered providing reciprocating linear motion between said extended and retracted positions;
   a linkage, comprising a connector arm connected to the rod of said piston of said actuator, said linkage further comprising a torque arm connectable to said winch, wherein said torque arm comprises an arm portion and a socket portion, said arm portion connected to said connector arm and said socket portion connectable to said winch;
   a power source for actuating said actuator; and
   wherein when said linkage is connected to said winch and when said actuator is actuating, said actuator transmits a tightening torque through said linkage to said winch.

4. The assembly of claim 3 wherein said socket portion is selectively rotatable relative to said arm portion.

5. The assembly of claim 4 wherein the direction of rotation of said socket portion relative to said arm portion being selectable.

6. The assembly of claim 5 wherein said power source comprises a source of pressurised air supplied to said actuator, the assembly further comprising a control panel for controlling the actuation of said actuator by controlling the application and venting of said pressurised air supplied to said actuator.

7. The assembly of claim 6 wherein said control panel comprises a pressure regulator and valve to adjust and activate said pressurised air.

8. The assembly of claim 7 wherein said pressure regulator is adjustable, to control the actuation of said actuator to transmit tightening torque through said linkage to said winch to produce the desired tension in said retaining element.

9. The assembly of claim 6 wherein said cylinder comprises a first chamber being positioned on one side of said piston and a second chamber being positioned on a side of said piston opposite said first chamber, the size of said chambers being alterable by movement of said piston within said cylinder.

10. The assembly of claim 9 wherein said control panel alternates between first applying pressurised air into said first chamber and venting air from said second chamber thereby forcing said piston towards said second chamber and second applying pressurised air into said second chamber and venting air from said first chamber thereby forcing said piston towards said first chamber.

11. The assembly of claim 10 wherein said actuator further comprises a pair of magnetic sensors positioned at opposite ends of said cylinder, each said sensor adapted to sense when said piston is in proximity to said sensor.

12. The assembly of claim 11 wherein said sensors send a signal to said control panel when they sense said piston, said control panel upon receiving said signal from one of said sensors acting to apply and vent pressurised air as necessary.

* * * * *